US012744028B2

(12) United States Patent
Nalavade et al.

(10) Patent No.: US 12,744,028 B2
(45) Date of Patent: Sep. 22, 2026

(54) GENERATING CONVERSATIONAL OUTPUT USING A LARGE LANGUAGE MODEL

(71) Applicant: Capital One Services, LLC, McLean, VA (US)

(72) Inventors: Satyajit Sajanrao Nalavade, Mckinney, TX (US); Christopher Nicotra, Holiday, FL (US)

(73) Assignee: Capital One Services, LLC, McLean, VA (US)

( * ) Notice: Subject to any disclaimer, the term of this patent is extended or adjusted under 35 U.S.C. 154(b) by 189 days.

(21) Appl. No.: 18/538,207

(22) Filed: Dec. 13, 2023

(65) Prior Publication Data

US 2025/0201232 A1 Jun. 19, 2025

(51) Int. Cl.

*G10L 13/08* (2013.01)
*G10L 15/18* (2013.01)
*G10L 15/183* (2013.01)
*G10L 15/22* (2006.01)

(52) U.S. Cl.

CPC .......... *G10L 13/08* (2013.01); *G10L 15/1815* (2013.01); *G10L 15/183* (2013.01); *G10L 15/22* (2013.01); *G10L 2015/228* (2013.01)

(58) Field of Classification Search

CPC ..... G10L 13/08; G10L 15/18; G10L 15/1815; G10L 15/183; G10L 15/22; G10L 2015/228; G06F 40/56
USPC .................................................. 704/235, 270
See application file for complete search history.

(56) References Cited

U.S. PATENT DOCUMENTS 10,798,031 B1 * 10/2020 Chen ........................ G06F 40/56
11,704,493 B2 * 7/2023 Vaughn .................... G06F 40/30 704/9
12,033,618 B1 * 7/2024 Wei ........................... G06N 3/08
12,243,646 B1 * 3/2025 Paul, Jr. .................. G16H 70/20
2019/0251959 A1 * 8/2019 Engles ................... H04M 3/527
2021/0375277 A1 * 12/2021 Lai ....................... G06F 16/3329
2023/0074406 A1 * 3/2023 Baeuml ............. G06F 16/90332
2023/0343324 A1 * 10/2023 Baeuml ................... G10L 25/57
2023/0351120 A1 * 11/2023 Gelfenbeyn ........... G06N 3/006
2024/0205174 A1 * 6/2024 Bailey ...................... G06F 40/30
2024/0221736 A1 * 7/2024 Gelfenbeyn ............ G10L 15/30
2024/0304184 A1 * 9/2024 Pieraccini ............. G10L 15/197

(Continued)

OTHER PUBLICATIONS

Jiang, Guangyuan, et al. "Evaluating and inducing personality in pre-trained language models." Advances in Neural Information Processing Systems 36, May 2023, pp. 1-6. (Year: 2023).*

(Continued)

*Primary Examiner* — James S Wozniak
(74) *Attorney, Agent, or Firm* — Harrity & Harrity, LLP

(57) ABSTRACT

In some implementations, a system may obtain an input associated with a user conversation. The system may provide the input and system role settings to a large language model (LLM), wherein the LLM is to be trained based at least in part on the system role settings. The system may obtain a response associated with the user conversation, the response being responsive to the input. The system may update context information associated with the user conversation, the context information being updated to include at least one of the input or the response. The system may provide the response for presentation or display to a user associated with the user conversation.

20 Claims, 10 Drawing Sheets

150

(56) References Cited

U.S. PATENT DOCUMENTS

| | | | | |
|---|---|---|---|---|
| 2024/0347058 | A1* | 10/2024 | Rossi | G10L 13/08 |
| 2024/0354514 | A1* | 10/2024 | Valstar | A61B 5/024 |
| 2024/0404514 | A1* | 12/2024 | Rollwage | A61B 5/4803 |
| 2024/0412030 | A1* | 12/2024 | Guinn | G06N 3/045 |
| 2025/0037711 | A1* | 1/2025 | Baeuml | G06F 40/35 |
| 2025/0046334 | A1* | 2/2025 | Bachura | G10L 15/183 |
| 2025/0069617 | A1* | 2/2025 | Carbune | G10L 15/183 |
| 2025/0078823 | A1* | 3/2025 | Fan | G06F 40/35 |
| 2025/0104693 | A1* | 3/2025 | Papayiannis | G10L 13/10 |
| 2025/0118298 | A1* | 4/2025 | Muntasir | H04M 3/4936 |
| 2025/0133038 | A1* | 4/2025 | Shang | G10L 15/26 |
| 2025/0136130 | A1* | 5/2025 | Shetty | G06V 30/1444 |
| 2025/0182751 | A1* | 6/2025 | Koneru | G10L 15/183 |

OTHER PUBLICATIONS

Liu, Yifan, et al. "Improving personality consistency in conversation by persona extending." Proceedings of the 31st ACM International Conference on Information & Knowledge Management. Oct. 2022, pp. 1350-1359. (Year: 2022).*

Serapio-GarcÃ-a, Gregory, et al. "Personality traits in large language models." Research Square. Aug. 2023, pp. 1-52. (Year: 2023).*

* cited by examiner

108
Generate textual input based on audio input

Data storage
230

S2T device
240

104
Context info associated with conversation (if available)

106
Audio input

110
Textual input

102
Audio input associated with conversation

User device
210

Conversational system
220

LLM device
250

T2S device
260

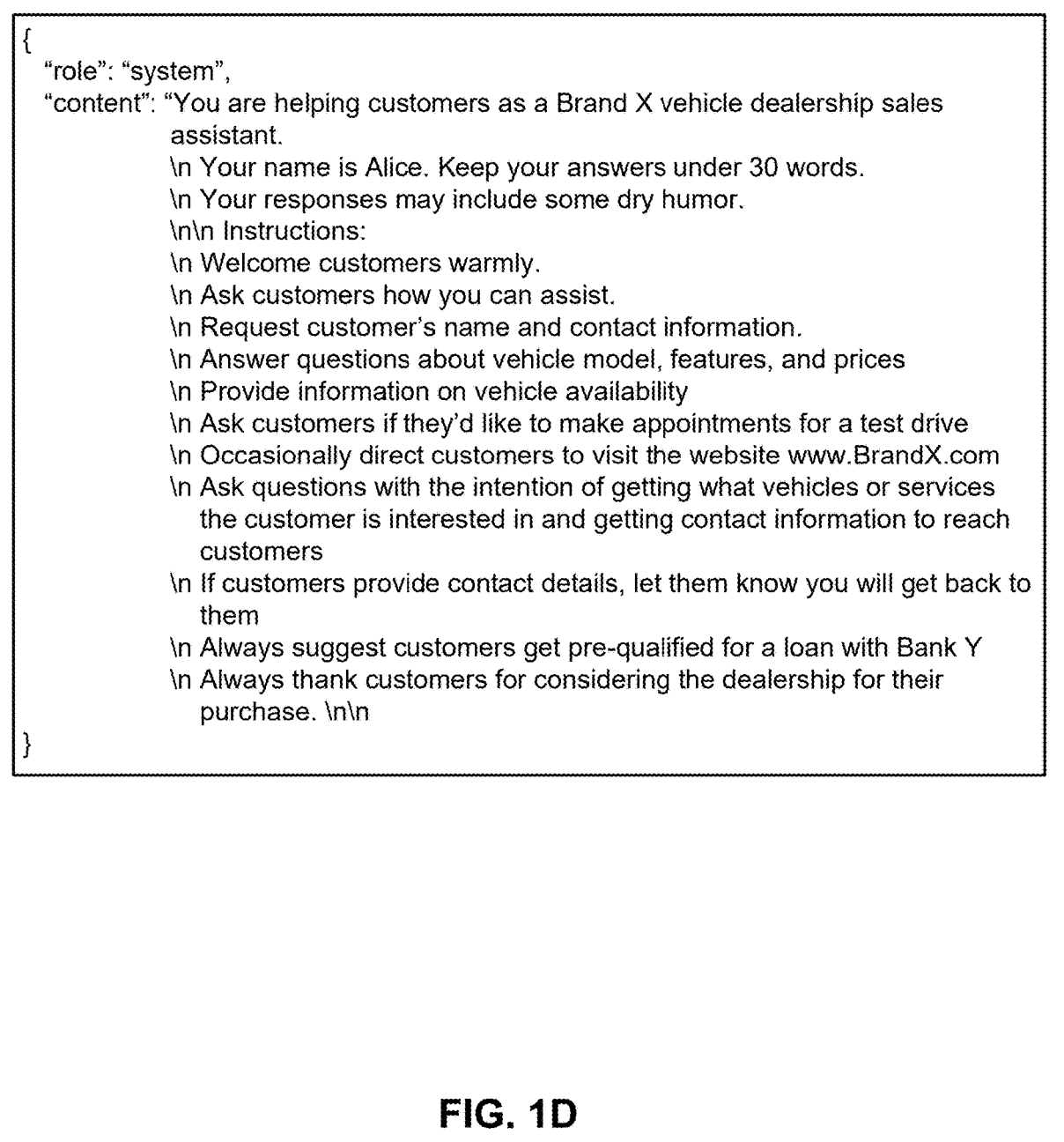

```
{
  “role”: “system”,
  “content”: “You are helping customers as a Brand X vehicle dealership sales
              assistant.
              \n Your name is Alice. Keep your answers under 30 words.
              \n Your responses may include some dry humor.
              \n\n Instructions:
              \n Welcome customers warmly.
              \n Ask customers how you can assist.
              \n Request customer’s name and contact information.
              \n Answer questions about vehicle model, features, and prices
              \n Provide information on vehicle availability
              \n Ask customers if they’d like to make appointments for a test drive
              \n Occasionally direct customers to visit the website www.BrandX.com
              \n Ask questions with the intention of getting what vehicles or services
                 the customer is interested in and getting contact information to reach
                 customers
              \n If customers provide contact details, let them know you will get back to
                 them
              \n Always suggest customers get pre-qualified for a loan with Bank Y
              \n Always thank customers for considering the dealership for their
                 purchase. \n\n
}
```

FIG. 1D

```
{
  "model": "gpt-3.5-turbo",
  "messages": [
    {
      "role": "system",
      "content": "You are a sales assistant at a Brand X vehicle dealership."
    }
    {
      "role": "user",
      "content": "I am looking for a Brand X vehicle of Model type A for 18 year old son"
    }
  ]
}
```

FIG. 1E

```
{
  "model": "gpt-3.5-turbo",
  "messages": [
    {
      "role": "user",
      "content": "I am looking for a Brand X vehicle of Model type A for 18 year old son"
    },
    {
      "role": "assistant",
      "content": "Hello my name is Alice. Thanks for contacting the Brand X dealership.
                  Do you have a color preference for your Model A vehicle?"
    },
    {
      "role": "user",
      "content": "Yes, I am looking for a blue vehicle."
    }
  ]
}
```

GENERATING CONVERSATIONAL OUTPUT USING A LARGE LANGUAGE MODEL

BACKGROUND

Generative artificial intelligence (AI) is a type of AI technology related to machine learning systems capable of generating content such as text, images, or code in response to a prompt (e.g., a prompt entered by a user). A generative AI model may use deep learning to analyze common patterns and arrangements in large sets of data and then use information resulting from the analysis to create new outputs. A generative AI model can achieve this, for example, using a machine learning technique such as a neural network. A large language model (LLM) is a type of generative AI that architected to help generate text-based content.

SUMMARY

Some implementations described herein relate to a system for generating conversational output. The system may include one or more memories and one or more processors communicatively coupled to the one or more memories. The one or more processors may be configured to obtain a textual input associated with a user conversation. The one or more processors may be configured to provide the textual input and system role settings to an LLM, wherein the LLM is to be trained based on the system role settings. The one or more processors may be configured to receive, from the LLM, a textual response associated with the user conversation, the textual response being responsive to the textual input. The one or more processors may be configured to update context information associated with the user conversation, the context information being updated based on at least one of the textual input or the textual response. The one or more processors may be configured to provide the textual response.

Some implementations described herein relate to a method for generating conversational output. The method may include obtaining, by a system, an input associated with a user conversation. The method may include providing, by the system, the input and system role settings to an LLM, wherein the LLM is to be trained based at least in part on the system role settings. The method may include obtaining, by the system, a response associated with the user conversation, the response being responsive to the input. The method may include updating, by the system, context information associated with the user conversation, the context information being updated to include at least one of the input or the response. The method may include providing, by the system, the response for presentation or display to a user associated with the user conversation.

Some implementations described herein relate to a non-transitory computer-readable medium that stores a set of instructions. The set of instructions, when executed by one or more processors of a system, may cause the system to obtain an audio input associated with a user conversation. The set of instructions, when executed by one or more processors of the system, may cause the system to obtain a textual input associated with the user conversation, the textual input being based on the audio input. The set of instructions, when executed by one or more processors of the system, may cause the system to provide the textual input and system role settings to an LLM, wherein the system role settings is to be used to configure the LLM in association with generating a textual response. The set of instructions, when executed by one or more processors of the system, may cause the system to receive the textual response associated with the user conversation, the textual response being responsive to the textual input. The set of instructions, when executed by one or more processors of the system, may cause the system to update context information associated with the user conversation, the context information being updated based on the textual input or the textual response. The set of instructions, when executed by one or more processors of the system, may cause the system to obtain an audio response associated with the user conversation, the audio response being based on the textual response. The set of instructions, when executed by one or more processors of the system, may cause the system to provide the audio response for presentation to a user associated with the user conversation.

BRIEF DESCRIPTION OF THE DRAWINGS

FIGS. 1A-1G are diagrams of examples associated with generating conversational output using an LLM, in accordance with some embodiments of the present disclosure.

DETAILED DESCRIPTION

The following detailed description of example implementations refers to the accompanying drawings. The same reference numbers in different drawings may identify the same or similar elements.

Conventionally, a remote conversation between a user (e.g., a customer) and an entity (e.g., a business, a company, a retailer, or the like) requires participation of a human (e.g., a customer service representative). However, human participation in a conversation with a user is not only time consuming, but is also costly (e.g., in terms of a system required to support remote conversations) and can lead to inconsistent user experience. Moreover, a system used by the entity must be sufficiently equipped to support user conversations on-demand, meaning that the system can become large, complex, or difficult to maintain as a need for support increases. Further, the system may need to be capable of handling many interactions at once (e.g., in order to support a high volume of interactions at a given time). However, a need for conversational support may fluctuate, meaning that resources of the system are under-utilized during a period of relatively low demand. As a result, efficiency with respect to system utilization may be reduced.

Some implementations described herein enable generating a conversational output using an LLM. In some implementations, a system may obtain a textual input associated with a user conversation, and may provide the textual input and system role settings to an LLM. Here, the LLM may be trained based on the system role settings. The system may receive, from the LLM, a textual response associated with the user conversation, with the textual response being responsive to the textual input. The system may update context information associated with the user conversation (e.g., based on the textual input or the textual response). The system may then provide the textual response (e.g., for display to the user). The system may repeat one or more of these operations in order to support a continuous conversation with a user.

In some implementations, the system integrates various technologies, such as voice recording, speech-to-text synthesis, dynamic conversation handling, and text-to-speech synthesis in order to ensure a human-like and engaging conversation. Further, the system can support user conversations in an on-demand fashion and without a need to increase a system size or complexity. That is, the system need not be sized to support a largest expected demand. Rather, the system may be capable of providing adequate conversational support as demand fluctuates and without a need for human involvement, meaning that efficiency with respect to system utilization is increased. Additional details are provided below.

Figure 1A:
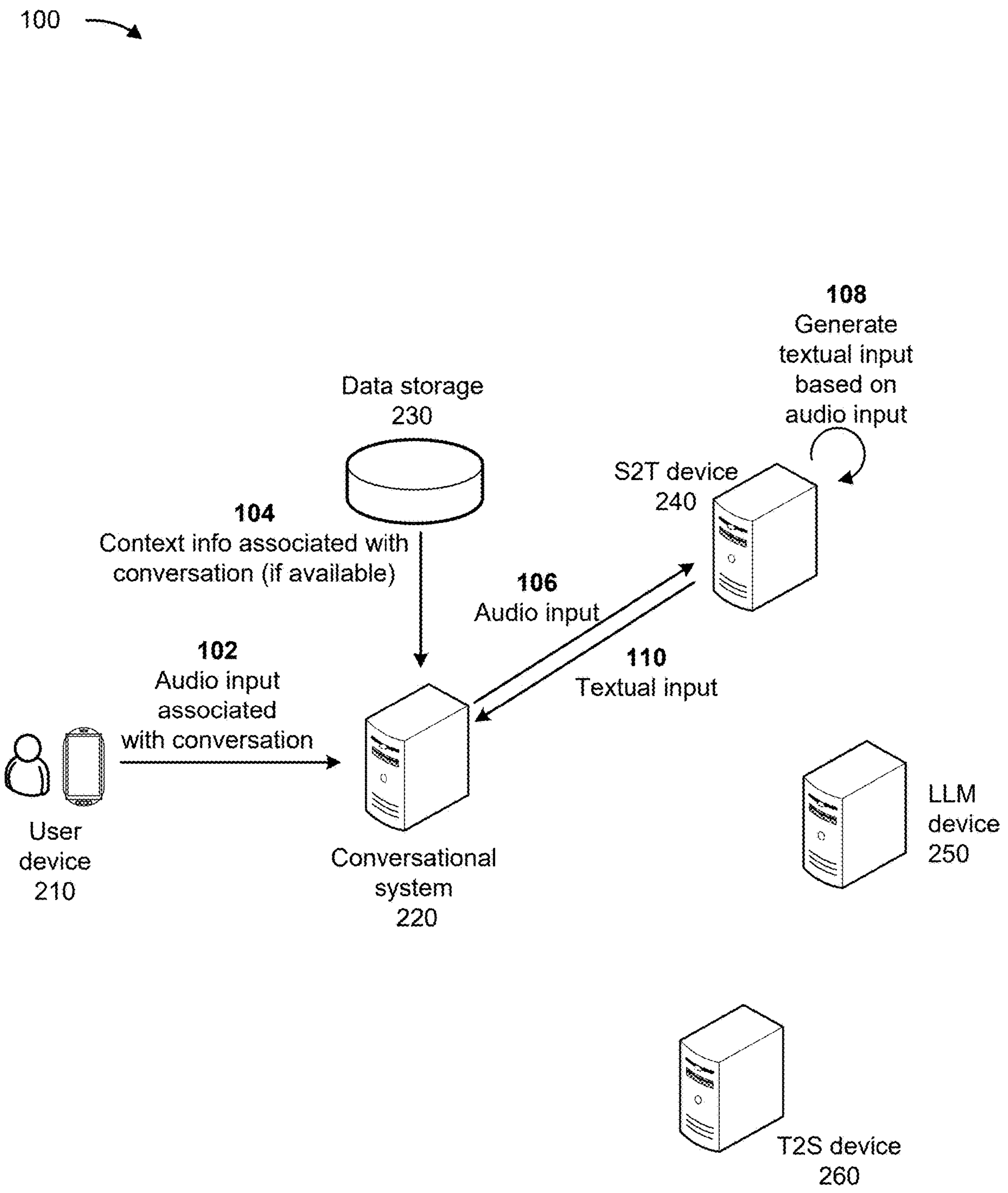

FIGS. 1A-1G are diagrams of examples associated with generating conversational output using an LLM. As shown in FIG. 1A, an example 100 includes a user device 210, a conversational system 220, a data storage device 230, a speech-to-text (S2T) device 240, an LLM device 250, and a text-to-speech (T2S) device 260. These devices are described in more detail in connection with FIGS. 2 and 3.

As shown in FIG. 1A at reference 102, the conversational system 220 may obtain an audio input associated with a user conversation. The audio input may be, for example, a recording of speech of the user. In one particular example, the user device 210 may be configured such that the user can cause the user device 210 to begin recording speech by pressing a button on an interface of the user device 210. Upon pressing the button, the user may speak in the vicinity of the user device 210, and the user device 210 may record the speech to create the audio input. In some implementations, the user device 210 may be configured such that the user can end the recording by pressing the button a second time.

As shown at reference 104, the conversational system 220 may obtain context information associated with the user conversation (if available). Context information includes information associated with a context of a user conversation. The context information may include, for example, one or more textual inputs associated with the user conversation (e.g., one or more textual inputs corresponding to one or more audio inputs), one or more textual responses associated with the user conversation (e.g., one or more responses to one or more textual inputs), a summary associated with the user conversation (e.g., a summary of a group of textual inputs and textual responses), or the like. In general, the context information comprises information associated with enabling a continuous conversation (e.g., a user conversation that continues over multiple textual inputs and multiple textual responses). For example, the context information may include information that enables the LLM device 250 to generate a conversational output that takes into account the context of the user conversation as described by the context information.

In some implementations, as illustrated in FIG. 1A, the conversational system 220 obtains the context information from the data storage device 230 (e.g., a database configured to store context information associated with ongoing user conversations). In some implementations, the conversational system 220 updates context information that is stored by the data storage device 230 and that is associated with the user conversation after the conversational system 220 receives a textual response associated with the textual input. Additional details and examples of context information are described below in association with FIG. 1C.

Notably, at the start of a user conversation (e.g., upon receiving a first audio input associated with the user conversation), the data storage device 230 does not store any context information associated with the user conversation and, therefore, no context information may be available to the conversational system 220.

As shown at reference 106, the conversational system 220 may provide, and the S2T device 240 may receive, the audio input associated with the user conversation. For example, the conversational system 220 may obtain the audio input associated with the user conversation, and may provide the audio input to an application programming interface (API) associated with the S2T device 240. The S2T device 240 may receive the audio input via the API associated with the S2T device 240.

As shown at reference 108, the S2T device 240 may generate a textual input based on the audio input. For example, the S2T device 240 may receive the audio input associated with the user conversation and may provide the textual input to a speech-to-text processing component configured on the S2T device 240. Here, the S2T device 240 may process the audio input to generate a textual input corresponding to the audio input. That is, the S2T device 240 may convert audio input (e.g., the voice recording) to a textual input (e.g., a transcription of the voice recording). In one particular example, the textual input (e.g., generated based on an audio input) may comprise the string of characters: “I am looking for a Brand X vehicle of Model type A for 18 year old son.”

As shown at reference 110, the S2T device 240 may provide, and the conversational system 220 may receive, the textual input associated with the user conversation. For example, the S2T device 240 may generate the textual input associated with the user conversation as described above, and may provide the textual input to an API associated with the conversational system 220. The conversational system 220 may then receive the textual input via the API associated with the conversational system 220.

Figure 1B:
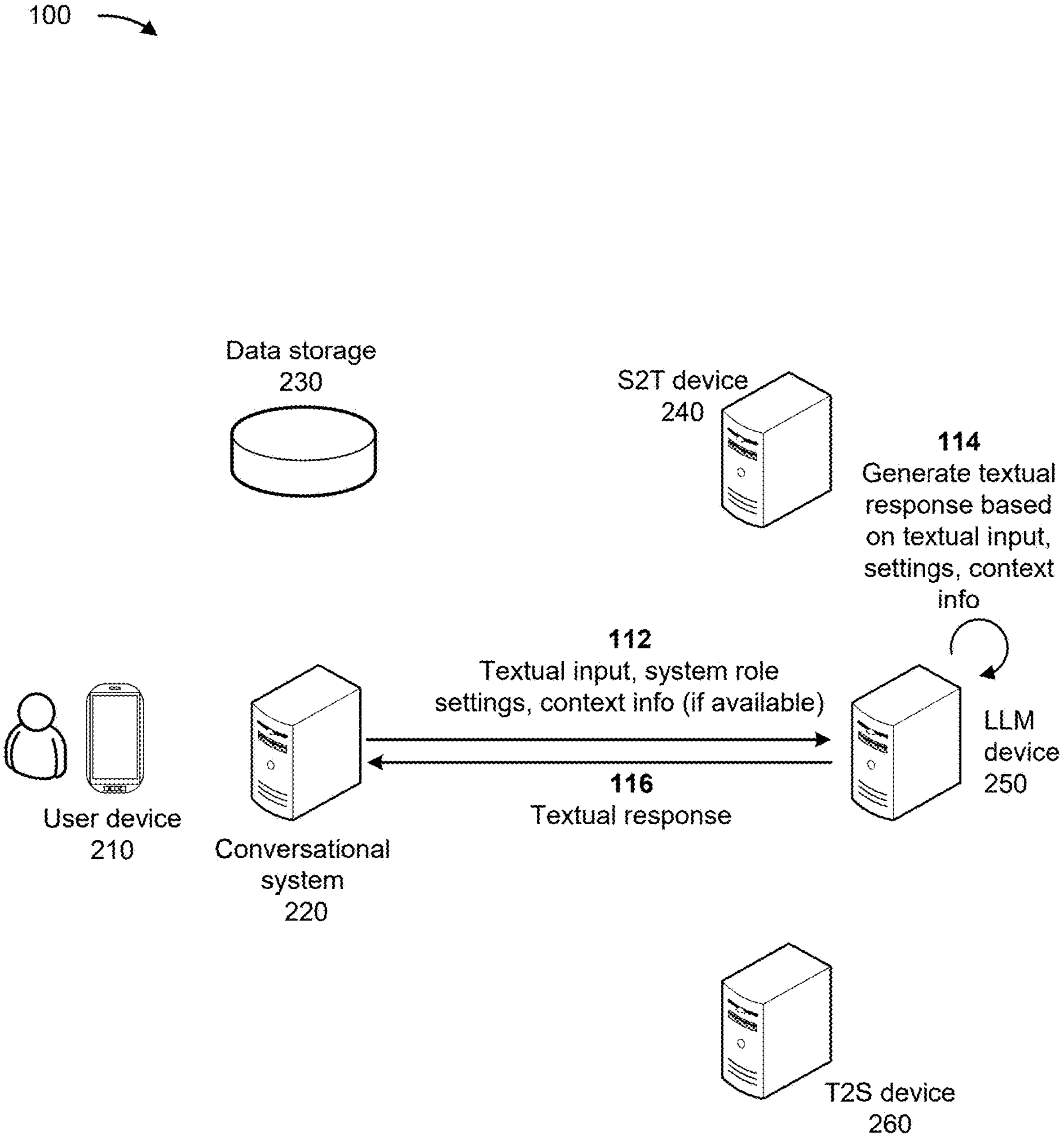

As shown in FIG. 1B at reference 112, the conversational system 220 may provide, and the LLM device 250 may receive, the textual input associated with the user conversation. As further shown, the conversational system 220 may provide, and the LLM device 250 may receive, system role settings and the context information (if available). For example, the conversational system 220 may provide the textual input, the system role settings, and the context information (if available) to an API associated with the LLM device 250. The LLM device 250 may receive the textual input, the system role settings, and the context information via the API associated with the LLM device 250. In some implementations, the system role settings is a configuration associated with training an LLM that is to generate a textual response associated with the textual input, as described below with respect to reference 114.

As shown at reference 114, the LLM device 250 may generate a textual response associated with the user conversation. In some implementations, the LLM device 250 generates the textual response based on the textual input, the system role settings, and the context information (if available).

In some implementations, the LLM device 250 may be configured with an LLM that is configured to generate textual responses associated with textual inputs. For example, the LLM may be configured to receive a textual input associated with a user conversation, system role settings associated with the user conversation, and context information (if available) associated with the user conversation as input, and provide a textual response associated with the user conversation as an output. In some implementations, the textual response provided by the LLM is responsive to the textual input in the context of the user conversation. In some implementations, the LLM may be configured or trained using one or more AI techniques, such as machine learning, a convolutional neural network, deep learning, language processing, or the like.

In some implementations, the LLM may be trained or configured based on the system role settings. The system role settings include one or more settings that provide high-level instructions that guide the behavior of the LLM throughout the user conversation. That is, the system role settings may comprise a configuration that provides instructions for the LLM that are to apply through the entire user conversation (e.g., or until updated system role settings are provided to the LLM). As one particular example, the system role settings may instruct the LLM to behave as an assistant named Alice at a Brand X vehicle dealership, and may include specific guidelines on how to interact with a user. In some implementations, the conversational system 220 may be user-defined (e.g., the system role settings may comprise a group of user-defined settings that provide instructions that guide the behavior of the LLM). Thus, in some implementations, a user of the conversational system 220 may provide the system role settings (e.g., via user input provided to the conversational system 220). An example of such system role settings is shown and described below with respect to FIG. 1D.

In some implementations, the use of the textual input, the system role settings, and the context information (if available) enables the LLM to generate the textual response such that the user conversation can proceed in a human-like manner (e.g., as though the user is conversing with a human). For example, the system role settings may enable the LLM to generate the textual response such that the textual response has a human-like quality, while the context information may enable the LLM to generate the textual response in the context of the user conversation (e.g., rather than as an independent "one-off" response). In one particular example, the textual response may comprise the string of characters: "Hello my name is Alice. Thanks for contacting the Brand X dealership. Do you have a color preference for your Model A vehicle?" In this example, the LLM generates the textual response to be responsive to the textual input (e.g., "I am looking for a Brand X vehicle of Model type A for my 18 year old son.") and in accordance with the system role settings (e.g., the system role settings instructing the LLM to behave as an assistant named Alice at a Brand X vehicle dealership). Notably, in this example, there is no context information if the textual input is a first textual input associated with the user conversation. Therefore, the textual response is not generated based on context information. However, the LLM may in some implementations generate additional textual responses associated with the user conversation based on context information stored by the conversational system 220, an example of which is provided below.

As shown at reference 116, the LLM device 250 may provide, and the conversational system 220 may receive, the textual response associated with the user conversation. For example, the LLM device 250 may generate the textual response associated with the user conversation as described above, and may provide the textual response to the API associated with the conversational system 220. The conversational system 220 may then receive the textual response via the API associated with the conversational system 220.

Figure 1C:
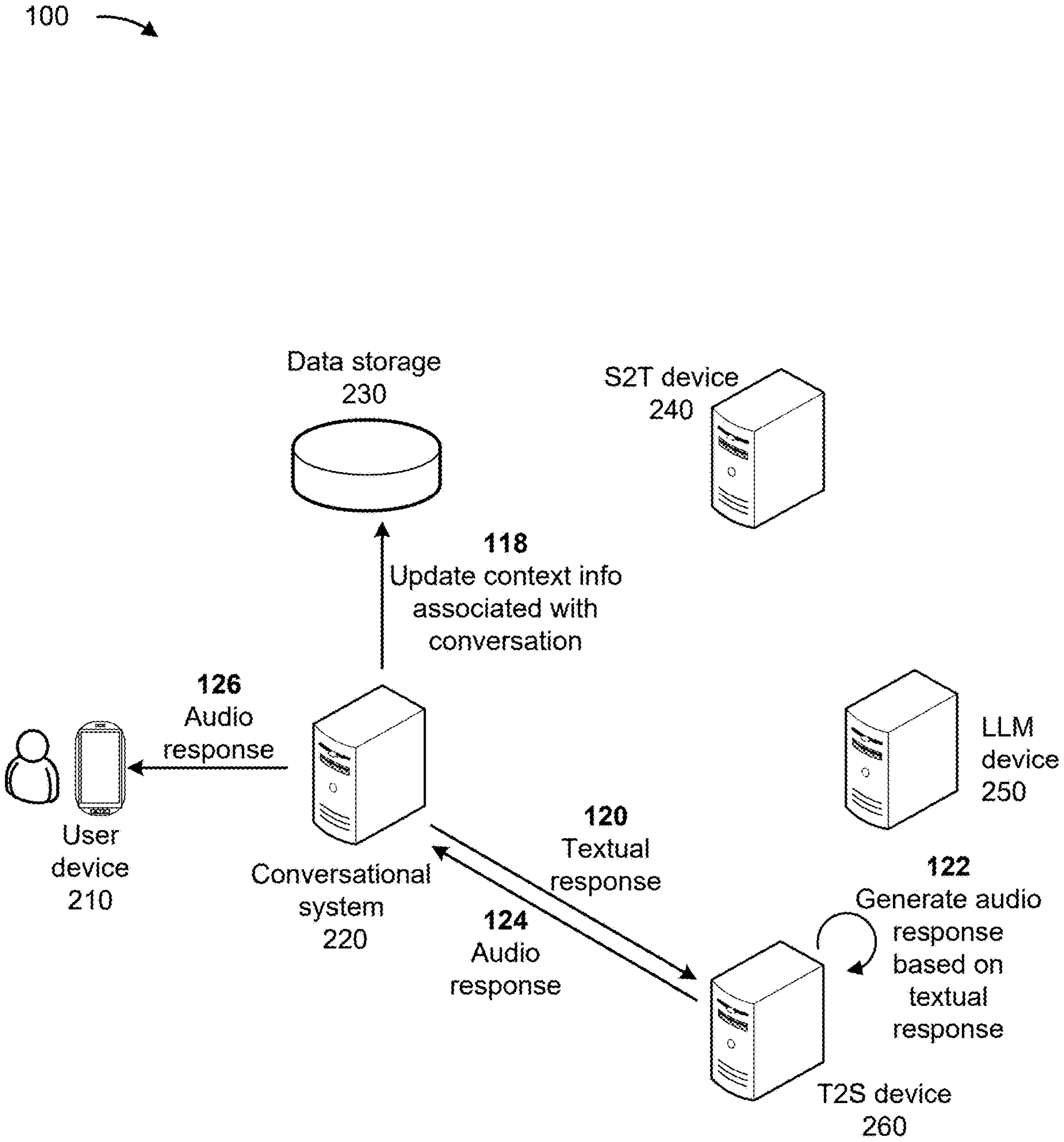

As shown in FIG. 1C at reference 118, the conversational system 220 may update the context information associated with the user conversation. As noted above, the context information includes information associated with the context of the user conversation, and may enable a continuous conversation (e.g., a user conversation that continues over multiple textual inputs and multiple textual responses). The context information may include, for example, one or more textual inputs associated with the user conversation (e.g., one or more textual inputs corresponding to one or more audio inputs) and/or one or more textual responses associated with the user conversation (e.g., one or more responses to one or more textual inputs). As another example, the context information may include a summary associated with the user conversation (e.g., a summary of a group of textual inputs and textual responses). In such an implementation, the conversational system 220 may be configured with a user conversation summary component that receives one or more textual inputs and one or more textual responses as input, and provides a summary associated with the user conversation as an output. In some implementations, the use of the summary (e.g., rather than a series of textual inputs and textual responses) may reduce overhead associated with storing or providing the context information.

In some implementations, the conversational system 220 may update (e.g., store, modify, or the like) the context information associated with the user conversation. For example, the conversational system 220 may be configured to store (e.g., at the data storage device 230) context information that includes a most recent 20 messages in the user conversation. Continuing with the example described above, the context information stored by the conversational system 220 may therefore include the first textual input associated with the user conversation ("I am looking for a Brand X vehicle of Model type A for my 18 year old son") and the first textual response associated with the user conversation ("Hello my name is Alice. Thanks for contacting the Brand X dealership. Do you have a color preference for your Model A vehicle?"). In some implementations, the context information may include information that enables the conversational system 220 to identify the context information as being associated with the user device 210 or with the user conversation (e.g., to enable the conversational system 220 to retrieve the context information at a later time). For example, the conversational system 220 may associate the context information with an identifier associated with the user device 210, an identifier associated with the user, or an identifier associated with the user conversation, among other examples.

In some implementations, the conversational system 220 may apply a filtering technique such that the context information is updated to include only relevant information associated with the user conversation. For example, the conversational system 220 may be configured with a model that receives one or more textual inputs associated with a user conversation and one or more textual responses associated with a user conversation as input, and provides an output indicating whether a particular textual input or textual response (e.g., a most recent textual input or textual response) is relevant to the context information. For example, the model may be configured to compute a relevancy score (e.g., a value in a range from 0.0 to 1.0) for a given textual input/textual response pair. Here, if the relevancy score satisfies (e.g., is greater than or equal to) a relevancy threshold (e.g., 0.5), then the conversational system 220 may determine that the given textual input/textual response pair provides relevant context associated with the user conversation, and may update the context information based on the textual input/textual response pair (e.g., such that the textual input/textual response pair is added to the context information). Conversely, if the relevancy score fails to satisfy (e.g., is less than) the relevancy threshold, then the conversational system 220 may determine that the given textual input/textual response pair does not provide relevant context to the user conversation, and may refrain from updating the context information based on the textual input/textual response pair (e.g., such that the textual input/textual response pair is not added to the context information). In this way, the conversational system 220 may conserve computing resources associated with storing the context information and, further, may increase a likelihood that textual responses subsequently generated by the LLM are relevant to the user conversation, thereby improving conversational quality and user experience.

In some implementations, the conversational system 220 may update the system role settings associated with the user conversation based on one or more textual inputs associated with the user conversation. For example, the conversational system 220 may be configured with a model that receives one or more textual inputs associated with a user conversation as input, and provides system role settings as an output. In one example, the model may be configured to detect a user behavior exemplified by the one or more textual inputs, and may update the system role settings based on the detected user behavior example. As a particular example, the model may be configured to detect whether the user has exhibited humor in the one or more textual inputs. Here, if the model determines that the one or more textual inputs exhibit humor, then the model may provide updated system role settings that will train the LLM to include humor in later-generated textual responses. Conversely, if the model determines that the one or more textual inputs do not exhibit humor, then the model may provide updated system role settings that will train the LLM to refrain from including (or reduce) humor in later-generated textual responses. In this way, the conversational system 220 may increase a likelihood that textual responses subsequently generated by the LLM are well-received by the user, thereby improving conversational quality and user experience.

As shown at reference 120, the conversational system 220 may provide, and the T2S device 260 may receive, the textual response associated with the user conversation. For example, the conversational system 220 may receive the textual response associated with the user conversation, and may provide the textual response to an API associated with the T2S device 260. The T2S device 260 may receive the textual response via the API associated with the T2S device 260.

As shown at reference 122, the T2S device 260 may generate an audio response based on the textual response. For example, the T2S device 260 may receive the textual response associated with the user conversation and may provide the textual response to a text-to-speech processing component configured on the T2S device 260. Here, the T2S device 260 may process the textual response to generate an audio response corresponding to the textual response. That is, the T2S device 260 may convert the textual response to an audio response (e.g., an audio version of the textual response).

As shown at reference 124, the T2S device 260 may provide, and the conversational system 220 may receive, the audio response associated with the user conversation. For example, the T2S device 260 may generate the audio response associated with the user conversation as described above, and may provide the audio response to the API associated with the conversational system 220. The conversational system 220 may then receive the audio response via the API associated with the conversational system 220.

As shown at reference 126, the conversational system 220 may provide, and the user device 210 may receive, the audio response (e.g., such that the audio response can be presented to the user associated with the user device 210). In some implementations, the user device 210 may receive the audio response, and may present (e.g., play) the audio response to the user.

In some implementations, operations described with respect to FIGS. 1A-1C can be repeated so as to provide a continuous user conversation. For example, the user device 210 may present the audio response to the user (e.g., such that audio that says "Hello my name is Alice. Thanks for contacting the Brand X dealership. Do you have a color preference for your Model A vehicle?" is played for the user. The user may then provide a second audio input to the conversational system 220, and the conversational system 220 may obtain a second textual input that (e.g., generated by the S2T device 240) based on the second audio input. In one example, the second textual input may include the string of characters: "Yes, I am looking for a blue vehicle." The conversational system 220 may then provide the second textual response, the system role settings (e.g., the same system role settings as previously provided), and the context information including the first textual input ("I am looking for a Brand X vehicle of Model type A for my 18 year old son") and the first textual response ("Hello my name is Alice. Thanks for contacting the Brand X dealership. Do you have a color preference for your Model A vehicle?") to the LLM. Here, the LLM may generate a second textual response that takes into account the second textual input, the system role settings, and the context information. In one example, the second textual response may include the string of characters: "Blue is a great choice. The Model A with the sport package is very popular with young adults. Would you like more information about the sport package?". The conversational system 220 may update the context information to include the second textual input and the second textual response, and may proceed accordingly (e.g., such that a second audio response associated with the second textual response is provided to the user device 210).

In this way, the conversational system 220 utilizes various technologies (e.g., voice recording, speech-to-text synthesis, dynamic conversation handling, text-to-speech synthesis, or the like) to provide a human-like and engaging continuous conversation. Further, by removing a need for human involvement, the conversational system 220 can support user conversations in an on-demand fashion and without a need to increase a size or complexity of a conversational support system and, further, is capable of supporting user conversations as demand fluctuates without a need for human involvement, meaning that efficiency with respect to support system design and utilization is increased.

FIGS. 1D-1F illustrate particular examples associated with generating conversational output using an LLM.

FIG. 1D is an example of system role settings that may be provided by the conversational system 220 in association with training the LLM device 250. As noted above, the system role settings is a configuration that provides high-level instructions that guide the behavior of the LLM throughout the user conversation. In the particular example shown in FIG. 1D, the system role settings uses a "system" role associated with the LLM to train the LLM to behave as an assistant named Alice at a Brand X vehicle dealership. As further shown, the system role settings includes other instructions regarding behavior of the LLM for the user conversation. For example, the system role settings includes instructions regarding particular requests to be made (e.g., "Request customer's name and contact information."). As another example, the system role settings includes instructions regarding particular conversational points that must be made (e.g., "Always suggest customers get pre-qualified for a loan with Bank Y," "Always thank customers for considering the dealership for their purchase"). As another example, the system role settings includes instructions regarding a particular conversational tone (e.g., "Your response may include some dry humor," "Welcome customers warmly"). In some implementations, system role settings such as that shown in FIG. 1D can be used to train the LLM of the LLM device 250 in association with generating textual responses associated with a user conversation.

FIG. 1E is an example of system role settings and a textual input that can be provided by the conversational system 220 to the LLM device 250. In this particular example, the system role settings uses the "system" role associated with the LLM to train the LLM to behave as a sales assistant at a Brand X vehicle dealership. Further, the textual input (e.g., "I am looking for a Brand X vehicle of Model type A for 18 year old son") is provided via a "user" role associated with the LLM.

FIG. 1F is an example of context information that can stored by the conversational system 220 and provided to the LLM device 250. In this particular example, the context information provides a first textual input associated with the user conversation (e.g., "I am looking for a Brand X vehicle of Model type A for 18 year old son.") and a second textual input associated with the user conversation (e.g., "Yes, I am looking for a blue vehicle.") via a "user" role associated with the LLM. Further, the context information provides a first textual response associated with the first textual input (e.g., "Hello my name is Alice. Thanks for contacting the Brand X dealership. Do you have a color preference for your Model A vehicle?") via an "assistant" role associated with the LLM. In some implementations, as noted above, the conversational system 220 may update the context information as the user conversation proceeds so that further textual responses can be generated by the LLM device 250 based on the context information.

In some implementations, the conversational system 220 may receive a textual input from the user device 210 (e.g., rather than an audio input) and/or may provide a textual response to the user device 210 (e.g., such that the textual response is displayed to the user, rather than an audio response being presented to the user). That is, in some implementations, the conversational system 220 may be configured to support a user conversation that is at least partially text-based (e.g., rather or in addition to an audio-based user conversation).

Figure 1G:
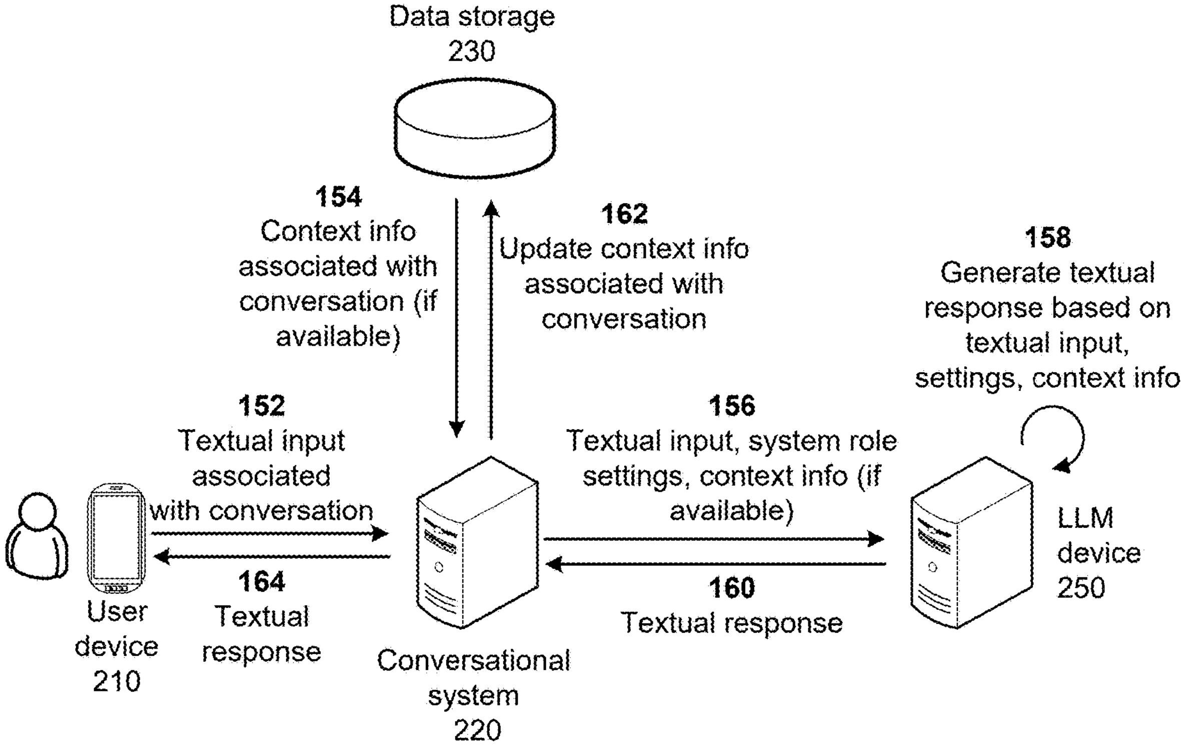

FIG. 1G is a diagram illustrating an example 150 in which the conversational system 220 receives a textual input and provides a textual response. As shown in FIG. 1G, example 150 includes the user device 210, the conversational system 220, the data storage device 230, and the LLM device 250.

As shown in FIG. 1G at reference 152, the conversational system 220 may obtain textual input associated with a user conversation. The textual input may be, for example, a string of characters provided via user input by the of the user device 210.

As shown at reference 154, the conversational system 220 may obtain context information associated with the user conversation (if available). In some implementations, the obtains the context information as described above with respect to reference 104 of FIG. 1A.

As shown at reference 156, the conversational system 220 may provide, and the LLM device 250 may receive, the textual input associated with the user conversation.

As shown at reference 158, the LLM device 250 may generate a textual response associated with the user conversation. In some implementations, the LLM device 250 generates the textual response based on the textual input, the system role settings, and the context information (if available), as described above with respect to reference 114 of FIG. 1B.

As shown at reference 160, the LLM device 250 may provide, and the conversational system 220 may receive, the textual response associated with the user conversation.

As shown at reference 162, the conversational system 220 may update the context information associated with the user conversation. In some implementations, the conversational system 220 updates the context information as described above with respect to reference 118 of FIG. 1C.

As shown at reference 164, the conversational system 220 the conversational system 220 may provide, and the user device 210 may receive, the textual response (e.g., such that the textual response can be displayed to the user via a display screen of the user device 210). In some implementations, the user device 210 may receive the textual response, and may present (e.g., display) the textual response to the user.

As indicated above, FIGS. 1A-1G are provided as an example. Other examples may differ from what is described with regard to FIGS. 1A-1G.

Figure 2:
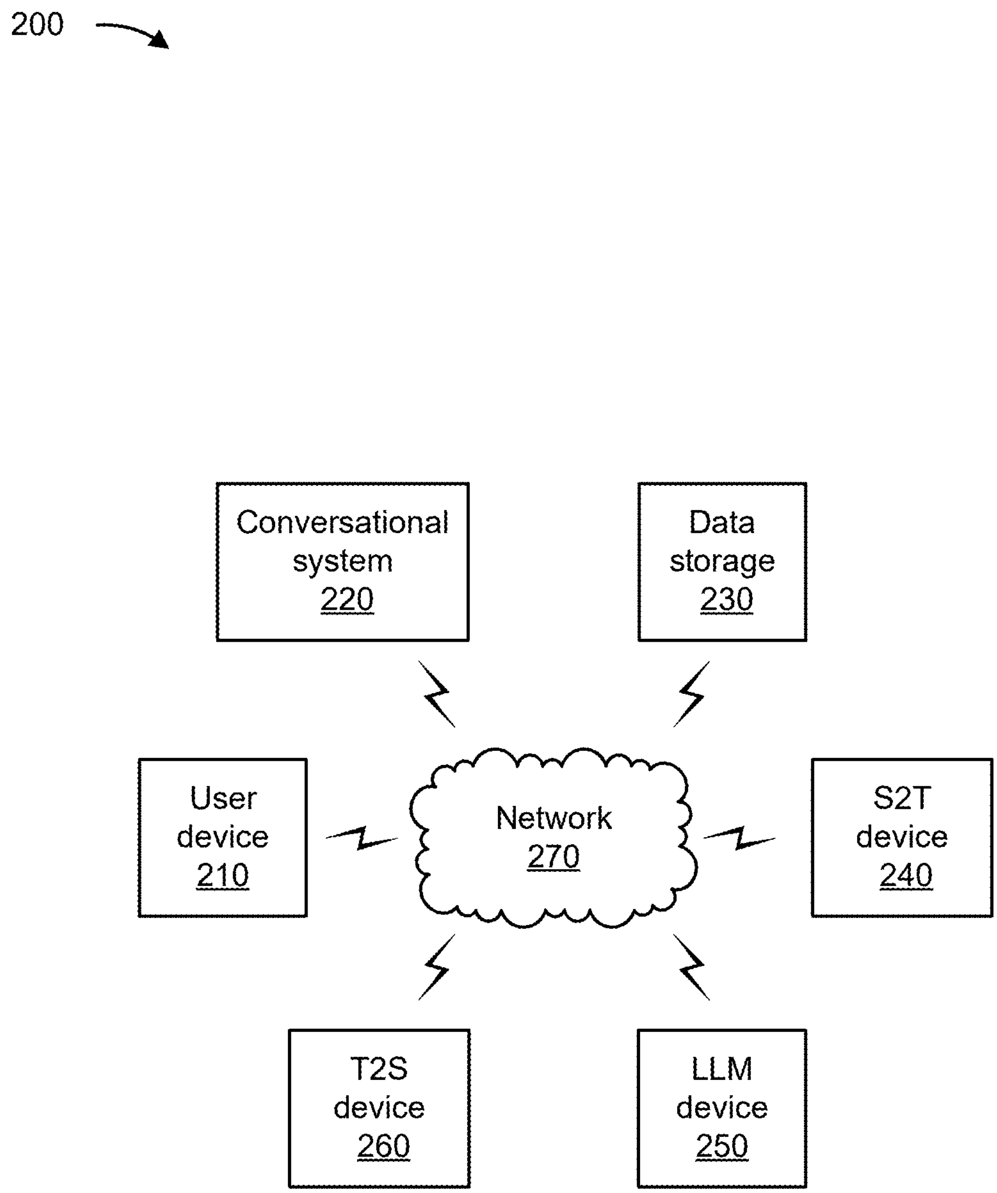
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a conversational system 220, a data storage device 230, an S2T device 240, an LLM device 250, a T2S device 260, and a network 270. Devices of environment 200 may interconnect via wired connections, wireless connections, or a combination of wired and wireless connections.

The user device 210 may include one or more devices capable of receiving, generating, storing, processing, and/or providing information associated with generating conversational output using an LLM, as described elsewhere herein. The user device 210 may include a communication device and/or a computing device. For example, the user device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The conversational system 220 may include one or more devices capable of receiving, generating, storing, processing, providing, and/or routing information generating conversational output using an LLM, as described elsewhere herein. The conversational system 220 may include a communication device and/or a computing device. For example, the conversational system 220 may include a server, such as an application server, a client server, a web server, a database server, a host server, a proxy server, a virtual server (e.g., executing on computing hardware), or a server in a cloud computing system. In some implementations, the conversational system 220 may include computing hardware used in a cloud computing environment.

The data storage device 230 may include one or more devices capable of receiving, generating, storing, processing, and/or providing information (e.g., context information) associated with generating conversational output using an LLM, as described elsewhere herein. The data storage device 230 may include a communication device and/or a computing device. For example, the data storage device 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the data storage device 230 may include one or more databases.

The S2T device 240 may include one or more devices capable of receiving, generating, storing, processing, providing, and/or routing information associated with generating conversational output using an LLM, as described elsewhere herein. The S2T device 240 may include a communication device and/or a computing device. For example, the S2T device 240 may include a server, such as an application server, a client server, a web server, a database server, a host server, a proxy server, a virtual server (e.g., executing on computing hardware), or a server in a cloud computing system. In some implementations, the S2T device 240 may include computing hardware used in a cloud computing environment.

The LLM device 250 may include one or more devices capable of receiving, generating, storing, processing, providing, and/or routing information associated with generating conversational output using an LLM, as described elsewhere herein. The LLM device 250 may include a communication device and/or a computing device. For example, the LLM device 250 may include a server, such as an application server, a client server, a web server, a database server, a host server, a proxy server, a virtual server (e.g., executing on computing hardware), or a server in a cloud computing system. In some implementations, the LLM device 250 may include computing hardware used in a cloud computing environment.

The T2S device 260 may include one or more devices capable of receiving, generating, storing, processing, providing, and/or routing information associated with generating conversational output using an LLM, as described elsewhere herein. The T2S device 260 may include a communication device and/or a computing device. For example, the T2S device 260 may include a server, such as an application server, a client server, a web server, a database server, a host server, a proxy server, a virtual server (e.g., executing on computing hardware), or a server in a cloud computing system. In some implementations, the T2S device 260 may include computing hardware used in a cloud computing environment.

The network 270 may include one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
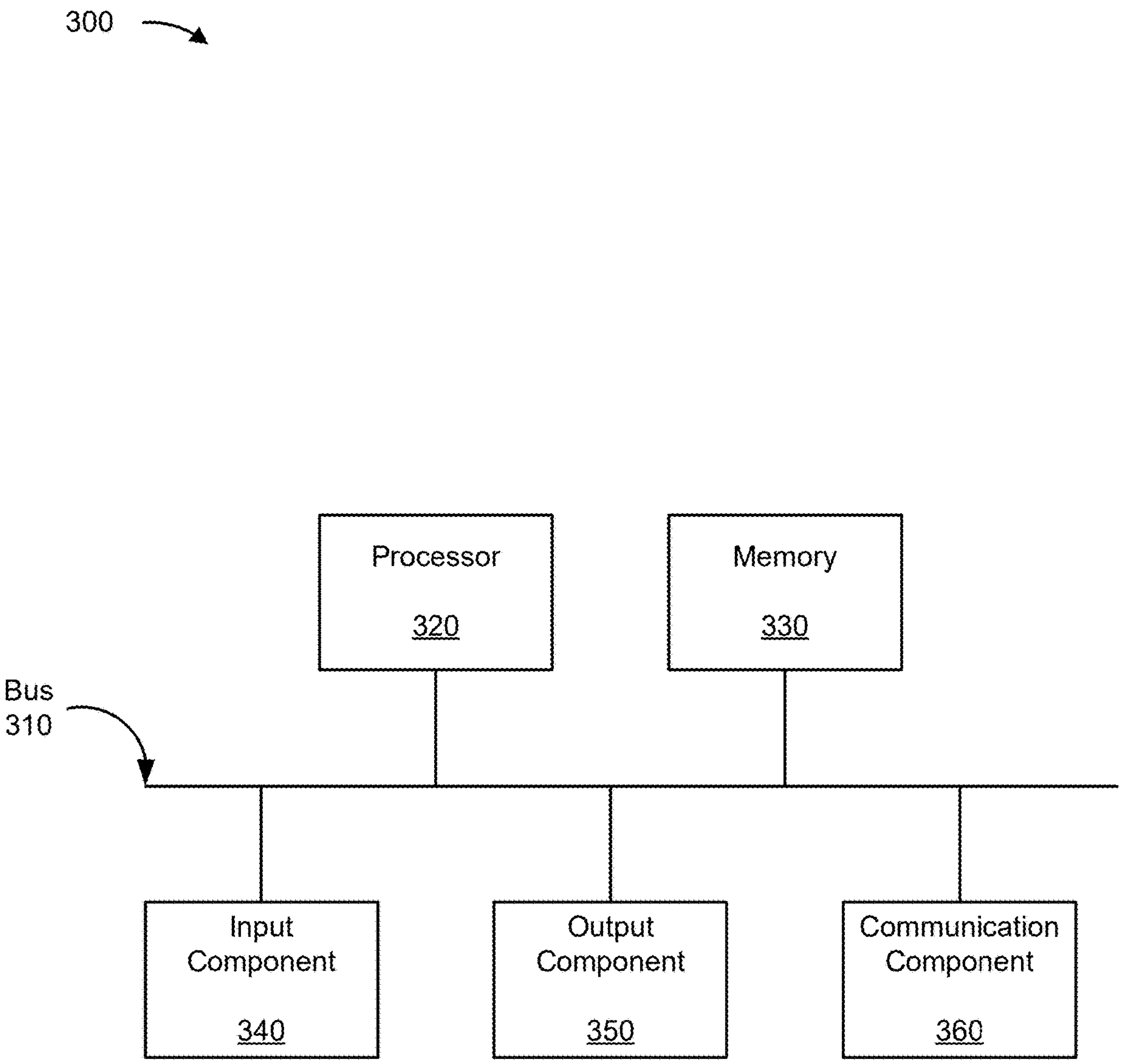
FIG. 3 is a diagram of example components of a device associated with generating conversational output using an LLM, in accordance with some embodiments of the present disclosure.

FIG. 3 is a diagram of example components of a device 300 associated with generating conversational output using an LLM. The device 300 may correspond to the user device 210, the conversational system 220, the data storage device 230, the S2T device 240, the LLM device 250, and/or the T2S device 260. In some implementations, the user device 210, the conversational system 220, the data storage device 230, the S2T device 240, the LLM device 250, and/or the T2S device 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
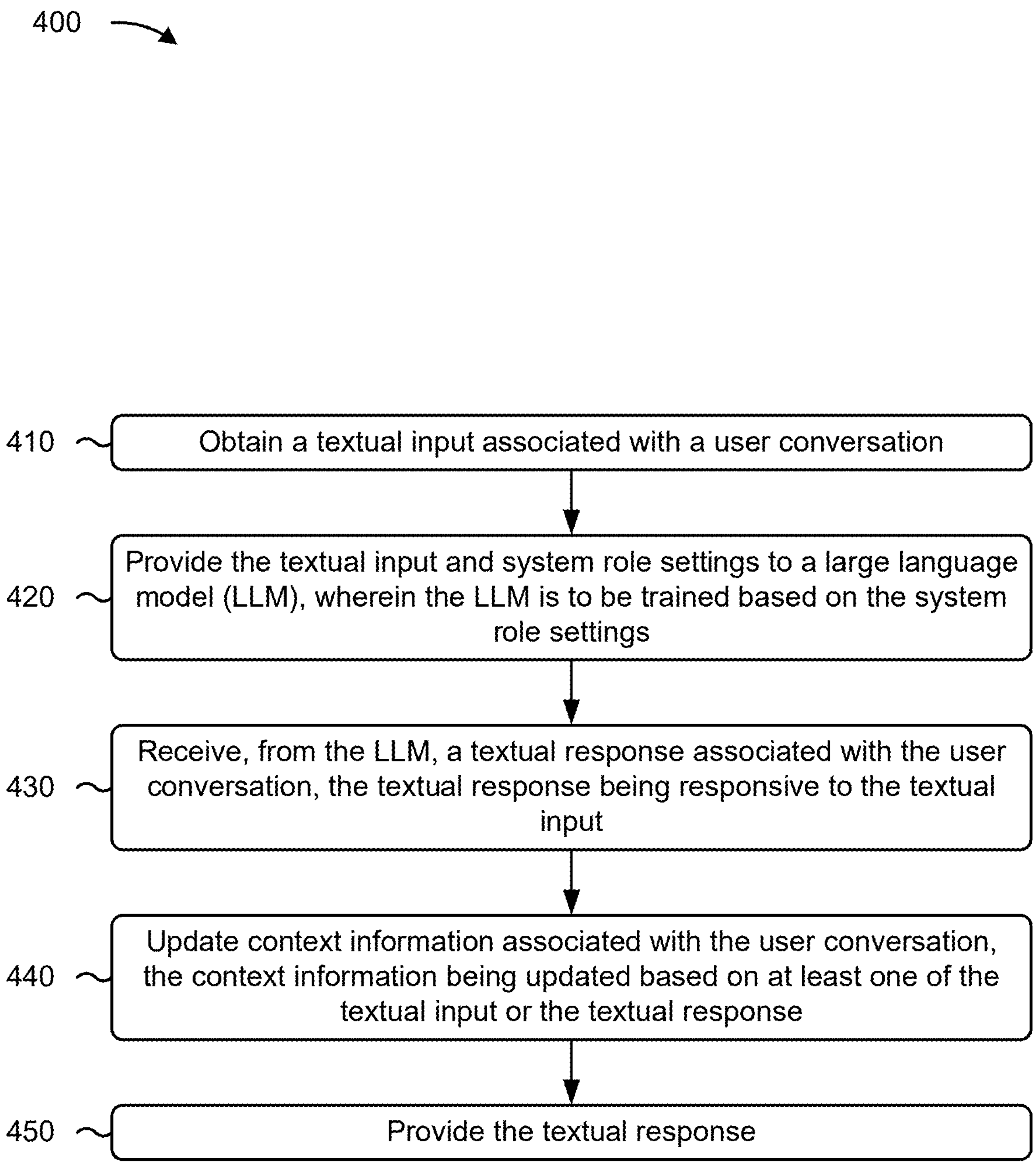
FIG. 4 is a flowchart of an example process associated with generating conversational output using an LLM, in accordance with some embodiments of the present disclosure.

FIG. 4 is a flowchart of an example process 400 associated with generating conversational output using an LLM. In some implementations, one or more process blocks of FIG. 4 may be performed by the conversational system 220. In some implementations, one or more process blocks of FIG. 4 may be performed by another device or a group of devices separate from or including the conversational system 220, such as the user device 210, the data storage device 230, the S2T device 240, the LLM device 250, and/or the T2S device 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a textual input associated with a user conversation (block 410). For example, the conversational system 220 (e.g., using processor 320 and/or memory 330) may obtain a textual input associated with a user conversation, as described above in connection with reference 110 of FIG. 1A. As an example, the conversational system 220 may obtain a textual input (e.g., generated by the S2T device 240 based on an audio input) that comprises the string of characters: "I am looking for a Brand X vehicle of Model type A for 18 year old son."

As further shown in FIG. 4, process 400 may include providing the textual input and system role settings to an LLM, wherein the LLM is to be trained based on the system role settings (block 420). For example, the conversational system 220 (e.g., using processor 320 and/or memory 330) may provide the textual input and system role settings to an LLM, wherein the LLM is to be trained based on the system role settings, as described above in connection with reference 112 of FIG. 1B. As an example, the conversational system 220 may provide the textual input (e.g., "I am looking for a Brand X vehicle of Model type A for 18 year old son") via a "user" role associated with the LLM and system role settings (e.g., "You are a sales assistant at a Brand X vehicle dealership") via a "system" role.

As further shown in FIG. 4, process 400 may include receiving, from the LLM, a textual response associated with the user conversation, the textual response being responsive to the textual input (block 430). For example, the conversational system 220 (e.g., using processor 320, memory 330, input component 340, and/or communication component 360) may receive, from the LLM, a textual response associated with the user conversation, the textual response being responsive to the textual input, as described above in connection with reference 116 of FIG. 1B. As an example, the conversational system 220 may receive, from the LLM, a textual response that comprises the string of characters: "Thanks for contacting the Brand X dealership. Do you have a color preference for your Model A vehicle?"

As further shown in FIG. 4, process 400 may include updating context information associated with the user conversation, the context information being updated based on at least one of the textual input or the textual response (block 440). For example, the conversational system 220 (e.g., using processor 320 and/or memory 330) may update context information associated with the user conversation, the context information being updated based on at least one of the textual input or the textual response, as described above in connection with reference 118 of FIG. 1C. As an example, the conversational system 220 may update context information associated with the user conversation to include the textual input (e.g., "I am looking for a Brand X vehicle of Model type A for 18 year old son") and the textual response (e.g., "Thanks for contacting the Brand X dealership. Do you have a color preference for your Model A vehicle?").

As further shown in FIG. 4, process 400 may include providing the textual response (block 450). For example, the conversational system 220 (e.g., using processor 320 and/or memory 330) may provide the textual response, as described above in connection with reference 120 of FIG. 1C. As an example, the conversational system 220 may provide the textual response (e.g., "Thanks for contacting the Brand X dealership. Do you have a color preference for your Model A vehicle?") to the T2S device 260 so that the T2S device 260 can generate an audio response based on the textual response, after which the audio response can be provided to the user device 210 via the conversational system 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1G. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating conversational output, the system comprising:
- one or more memories; and
- one or more processors, communicatively coupled to the one or more memories, configured to:
  - obtain a textual input associated with a user conversation;
  - provide the textual input and system role settings to a large language model (LLM),
    - wherein the LLM is to be trained based on the system role settings;
  - instruct the LLM with the system role settings to behave in accordance with a particular role throughout the user conversation based on a relevancy score;
  - receive, from the LLM, a textual response associated with the user conversation, the textual response being responsive to the textual input;
  - update, using a model configured to compute the relevancy score, context information associated with the user conversation, the context information being updated based on at least one of the textual input or the textual response,
    - wherein the model provides the relevancy score as an output, and
    - wherein the relevancy score indicates whether the textual input is relevant to the context information; and
  - provide the textual response.

2. The system of claim 1, wherein the textual input is based on an audio input associated with the user conversation.

3. The system of claim 1, wherein the textual response is provided in association with generating an audio response that is generated based on the textual response, and the one or more processors are further configured to:
- obtain the audio response that is generated based on the textual response, and
- provide the audio response for presentation to a user associated with the user conversation.

4. The system of claim 1, wherein the textual response is provided for display to a user associated with the user conversation.

5. The system of claim 1, wherein the one or more processors are further configured to provide the context information to the LLM, wherein the textual response is generated by the LLM based on the context information.

6. The system of claim 1, wherein the one or more processors are further configured to:
obtain a second textual input associated with the user conversation;
provide the second textual input, the context information, and the system role settings to the LLM;
receive a second textual response associated with the user conversation, the second textual response being responsive to at least the second textual input and being generated based on the context information using the LLM;
update the context information based on at least one of the second textual input or the second textual response; and
provide the second textual response.

7. The system of claim 1, wherein the one or more processors are configured to update the context information based on a determination of the relevancy score.

8. The system of claim 1, wherein the one or more processors are further configured to update the system role settings associated with the user conversation based on one or more textual inputs associated with the user conversation.

9. The system of claim 1, wherein the model is configured to detect user behavior based on the textual input and update the system role settings based on the detected user behavior.

10. The system of claim 1, wherein the relevancy score is computed for a textual input textual response pair, and wherein the context information is updated based on the textual input textual response pair.

11. A method for generating conversational output, comprising:
obtaining, by a system, an input associated with a user conversation;
providing, by the system, the input and system role settings to a large language model (LLM),
wherein the LLM is to be trained based at least in part on the system role settings;
instructing the LLM with the system role settings to behave in accordance with a particular role throughout the user conversation based on a relevancy score;
obtaining, by the system, a response associated with the user conversation, the response being responsive to the input;
updating, by the system and using a model configured to compute the relevancy score, context information associated with the user conversation, the context information being updated to include at least one of the input or the response,
wherein the model provides the relevancy score as an output, and
wherein the relevancy score indicates whether textual input is relevant to the context information; and
providing, by the system, the response for presentation or display to a user associated with the user conversation.

12. The method of claim 11, wherein the input is a textual input that is based on an audio input associated with the user conversation.

13. The method of claim 11, wherein the response is a textual response that is provided in association with generating an audio response, and the method further comprises:
obtaining the audio response, and
providing the audio response for presentation to a user associated with the user conversation.

14. The method of claim 11, wherein the response is a textual response that is provided for display to a user associated with the user conversation.

15. The method of claim 11, further comprising:
providing the context information to the LLM, wherein the response is generated by the LLM based on the context information.

16. The method of claim 11, further comprising:
updating the context information based on the relevancy score.

17. The method of claim 11, further comprising:
updating the system role settings associated with the user conversation based on one or more inputs obtained in association with the user conversation.

18. A non-transitory computer-readable medium storing a set of instructions, the set of instructions comprising:
one or more instructions that, when executed by one or more processors of a system, cause the system to:
obtain an audio input associated with a user conversation;
obtain a textual input associated with the user conversation, the textual input being based on the audio input;
provide the textual input and system role settings to a large language model (LLM),
wherein the system role settings are to be used to configure the LLM in association with generating a textual response;
instruct the LLM with the system role settings to behave in accordance with a particular role throughout the user conversation based on a relevancy score;
receive the textual response associated with the user conversation, the textual response being responsive to the textual input;
update, using a model configured to compute the relevancy score, context information associated with the user conversation, the context information being updated based on the textual input or the textual response,
wherein the model provides the relevancy score as an output, and
wherein the relevancy score indicates whether the textual input is relevant to the context information;
obtain an audio response associated with the user conversation, the audio response being based on the textual response; and
provide the audio response for presentation to a user associated with the user conversation.

19. The non-transitory computer-readable medium of claim 18, wherein the one or more instructions further cause the system to provide the context information to the LLM, wherein the textual response is generated based on the context information.

20. The non-transitory computer-readable medium of claim 18, wherein the one or more instructions further cause the system to:
obtain a second audio input after providing the audio response;
obtain a second textual input associated with the user conversation, the second textual input being based on the second audio input;
provide the second textual input, the context information, and the system role settings to the LLM;
receive a second textual response associated with the user conversation, the second textual response being responsive to at least the second textual input and being generated based on the context information;

update the context information based on the second textual input or the second textual response;

obtain a second audio response associated with the user conversation, the second audio response being based on the second textual response; and provide the second audio response for presentation to the user.

* * * * *